United States Patent
Lalor et al.

(10) Patent No.: US 6,332,354 B1
(45) Date of Patent: Dec. 25, 2001

(54) METHOD AND APPARATUS FOR DETERMINING VEHICLE BRAKE EFFECTIVENESS

(75) Inventors: Tom Lalor, 2694 Haywood Avenue, West Vancouver, British Columbia (CA), V7V 1Y6; Craig Luker, Kamloops (CA); John Loam, San Diego, CA (US)

(73) Assignee: Tom Lalor, West Vancouver (CA)

( * ) Notice: Subject to any disclaimer, the term of this patent is extended or adjusted under 35 U.S.C. 154(b) by 0 days.

(21) Appl. No.: 09/269,179
(22) PCT Filed: Jul. 29, 1998
(86) PCT No.: PCT/CA98/00727
§ 371 Date: Mar. 26, 1999
§ 102(e) Date: Mar. 26, 1999
(87) PCT Pub. No.: WO99/06809
PCT Pub. Date: Feb. 11, 1999

(30) Foreign Application Priority Data

Jul. 29, 1997 (CA) .................................... 2211815

(51) Int. Cl.$^7$ ....................................................... G01L 5/28
(52) U.S. Cl. ................................. 73/121; 73/129; 701/70
(58) Field of Search ........................... 73/121, 128, 129; 701/29, 33, 36, 45, 48, 70, 71, 74, 75

(56) References Cited

U.S. PATENT DOCUMENTS

| | | |
|---|---|---|
| 5,043,896 * | 8/1991 | Sol . |
| 5,299,452 * | 4/1994 | Caron et al. ........................ 73/129 |
| 5,467,645 | 11/1995 | Skorupski et al. . |
| 5,535,122 | 7/1996 | Wood et al. . |
| 5,744,707 | 4/1998 | Kull . |
| 5,918,953 * | 7/1999 | Nihei et al. . |
| 6,188,316 * | 2/2001 | Matsuno et al. . |

FOREIGN PATENT DOCUMENTS 39 39 009 A1   5/1991   (DE) .

* cited by examiner

Primary Examiner—Eric S. McCall
(74) Attorney, Agent, or Firm—Hoffman, Wasson & Gitler

(57) ABSTRACT

This invention relates to a method and apparatus for determining the effectiveness of a vehicle braking system and for measuring changes in the mass of a wheeled vehicle. The method and apparatus include manually or automatically measuring and inputting vehicle mass to a computer, measuring and inputting brake system pressure during deceleration of the vehicle in a normal operating mode, measuring and inputting road slope, measuring and inputting air friction and engine friction of the vehicle, determining a predicted deceleration of the vehicle, measuring actual deceleration of the vehicle, and providing and using a computer to calculate the effectiveness of the vehicle braking system from data representing actual deceleration of the vehicle, road slope, air friction, engine friction, brake system pressure, vehicle mass, and predicted deceleration for the vehicle under comparable circumstances, and generating a signal representative of the effectiveness of the vehicle braking system. The invention also includes a mechanism to record and store data.

21 Claims, 6 Drawing Sheets

METHOD AND APPARATUS FOR DETERMINING VEHICLE BRAKE EFFECTIVENESS

FIELD OF THE INVENTION

This invention relates to a method and apparatus for determining vehicle brake effectiveness and changes in vehicle mass.

BACKGROUND OF THE INVENTION

In order for a driver to operate a vehicle safely he must know and have confidence in the stopping distance, and thereby the deceleration rate, of the vehicle in all environments. Drivers learn to judge this distance based on vehicle speed, road slope, road surface and load conditions.

Two conditions that can alter the driver's perception of a safe stopping distance are a non-functioning or partially functioning brake system or an unknown overload condition. As brakes do not wear linearly and can be affected by temperature, brake lining condition, moisture, adjustment, and mechanical problems, stopping distance can change over a short period. In addition, a vehicle may take on an unexpectedly heavy load, thus affecting stopping distance or vehicle deceleration rate.

Various systems for checking the effectiveness of vehicle braking systems are known. Common methods include visual inspection, mechanical devices (roller testers, plate testers), brake pressure gauges, and weigh scales to assure proper vehicle mass.

U.S. Pat. No. 5,299,452 (Caron et al.) determines vehicle braking effectiveness by first measuring engine torque to automatically calculate vehicle mass and then employing a complex averaging method to attempt to mitigate the effects of road slope, head winds, tail winds and the like. The accuracy of vehicle mass calculated by this method, using engine torque, is dependant on constant engine horsepower, transfer of horsepower to the wheels, fuel consumption, altitude, road surface and a level acceleration area. Changing vehicle conditions and variations in normal driving conditions such as uneven terrain, can significantly distort the calculation of vehicle mass using this method. In addition, estimating brake effectiveness based on level road conditions does not account for travelling up or down a slope. A brake effectiveness test that does not take into consideration road slope does not offer the real time feedback necessary to provide a true safety application.

It would therefore be desirable to provide a method and apparatus for providing feedback on vehicle brake effectiveness for vehicles that do not decelerate in the expected rate over a large spectrum of environments.

It would further be desirable to provide a method and apparatus of assessing vehicle brake effectiveness which takes into consideration travelling up or down a slope, differences in drag forces such as air friction and engine friction and engine brake engagement.

It would also be desirable to provide a method and apparatus of assessing vehicle brake effectiveness which includes a means of manually or automatically inputting the actual mass of the vehicle for use in calculating vehicle brake effectiveness.

It would further be desirable to provide a method and apparatus of assessing vehicle brake effectiveness based on a comparison with known vehicle deceleration rates for a known vehicle mass at 100% braking effectiveness.

It would also be desirable to provide a method and apparatus of assessing vehicle brake effectiveness based on a comparison with the minimum acceptable deceleration rate for the vehicle.

It would also be desirable to provide a method and apparatus of assessing vehicle brake effectiveness based on driver expected deceleration rates or on vehicle braking effectiveness history. Data collected on historical braking effectiveness can provide trends which may be critical in assessing real time vehicle safety and monitoring vehicle maintenance requirements.

A further desirable object is to provide an apparatus and method for alerting an operator to a deterioration in braking effectiveness or to a mass overload situation so that corrective action could be taken before the problem becomes critical.

It is also desirable that a method and apparatus be provided which will permit easy access to stored vehicle brake effectiveness data by certain authorized government regulatory agencies for the purpose of accessing vehicle safety.

While other methods of assuring effective braking for the main purpose of driver feedback and safety have a certain degree of efficiency in certain environments or braking areas, they do not provide the advantages of the improved methods and apparatus of the present invention as hereafter more fully described.

SUMMARY OF THE INVENTION

Determination of vehicle brake effectiveness is accomplished by comparing predicted vehicle deceleration rates and driver expected deceleration rates, with actual measured vehicle deceleration. Predicted and expected deceleration rates are adjusted for variations in driving conditions such as slope and drag.

If vehicle brake effectiveness is considered to be 100%, relative gross vehicle weight (GVW) can also be estimated by a comparison of predicted vehicle deceleration rates with the actual measured vehicle deceleration rate.

An input device, which may be an interactive display/input device, allows the operator to input load information manually, or automatically through a radio frequency (RF) input interface or other standard communication means connected to an automated weigh scale. In this way, mass stored in memory provides an accurate figure, which can always be assured. As mass has a great impact on deceleration it is important that this figure be accurate and consistent. A minimum acceptable deceleration rate is also input and fixed in memory for comparison to actual vehicle deceleration rates.

For economic considerations it is desirable that the device obtain data from various existing sensors which gather and use the data for other purposes. This eliminates the need for the installation of additional sensors and control devices. Most modern tractor semi-trailers are equipped with an electronic control unit (ECU) which generates a signal representative of vehicle wheel speed, distance, RPM, gear ratio and brake system pressure. In some older vehicles which do not have the necessary sensors or ECU, it may be necessary to install sensors and ECUs to gather and process the required data.

Pressure transducers located throughout the vehicle measure pressure applied to the brake air chambers when the vehicle is being decelerated during an application of its brakes. This data is sent to the vehicle ECU via the automatic braking system (ABS) and a signal representative of the brake system pressure is generated. At the same time, or in the alternative, a brake treadle pressure sensor may be used to determine brake system pressure.

Road slope is calculated by comparing measurements from a low-G accelerometer with wheel based deceleration rates taken from the ABS. Slope angle is used to adjust deceleration rates for a more accurate comparison with actual and expected values.

In addition, the main ECU provides data on vehicle speed, engine torque, engine RPM and engine brake engagement (exhaust brake) which is used to adjust deceleration for drag forces. Engine brake engagement is monitored to assess the validity of any results. If the engine brake is engaged, results are invalidated and discarded.

Actual deceleration is compared to predicted deceleration which has been adjusted for slope and drag. Actual deceleration is also compared to driver expected deceleration rates and a minimum acceptable deceleration rate. Historic deceleration data stored by the computer can-be used to assess vehicle brake effectiveness over time and determine maintenance schedules or provide data for government safety inspections. Comparisons are highly accurate due to the various adjustments for slope and drag and the accurate value for vehicle mass which has been manually or automatically input. The computer collects and stores data on vehicle brake effectiveness over time for the purposes of historical comparison, maintenance assessment and brake inspection.

The invention provides feedback on vehicle deceleration rate and signals a trend of degrading brake effectiveness during vehicle deceleration. Deviations from expected values could be the result of brake problems, normal wear or an unknown vehicle mass overload condition.

Results are automatically stored in memory for future reference and historical brake effectiveness comparisons, and may be transferred via various communications interferes to external devices for other purposes such as maintenance control, government monitoring or corporate data gathering.

It is therefore an object of the present invention to provide an apparatus and method for determining vehicle brake effectiveness.

It is a further object of the present invention to provide a method and apparatus to give feedback on vehicle brake effectiveness for vehicles that do not decelerate in the expected rate over a large spectrum of environments.

It is a still further object of the present invention to provide a method and apparatus of assessing vehicle brake effectiveness which takes into consideration travelling up or down a slope, differences in drag forces such as air friction and engine friction and engine brake engagement.

It is also an object of the present invention to provide a method and apparatus of assessing vehicle brake effectiveness which includes a means of manually or automatically inputting the actual mass of the vehicle for use in calculating vehicle brake effectiveness.

It is a further object of the present invention to provide a method and apparatus of assessing vehicle brake effectiveness based on a comparison with known vehicle deceleration rates for a known vehicle mass at 100% braking effectiveness.

It is an object of a preferred embodiment of the present invention to provide a method and apparatus of assessing vehicle brake effectiveness based on a comparison with the minimum acceptable deceleration rate for the vehicle.

It is another object of a preferred embodiment of the present invention to provide a method and apparatus of assessing vehicle brake effectiveness based on a comparison with driver expected deceleration rates or with vehicle braking effectiveness history.

It is yet another object of a preferred embodiment of the present invention to provide a method and apparatus of determining a potential vehicle mass overload condition that affects the vehicle deceleration rate.

A further object of a preferred embodiment of the present invention is to provide an apparatus and method for alerting an operator to a deterioration in braking effectiveness or to a mass overload problem so that corrective action can be taken before the problem becomes critical.

It is also an object of a preferred embodiment of the present invention to provide a method and apparatus which will permit easy access to the stored data on vehicle brake effectiveness for the purposes of vehicle maintenance or for providing the data to certain authorized government regulatory agencies for the purpose of assessing vehicle safety or vehicle load conditions.

According to the present invention then, there is provided an apparatus for calculating the effectiveness of a vehicle braking system during deceleration of the vehicle, comprising: a computer; a means for inputting a baseline deceleration rate of the vehicle to the computer; a means for inputting the mass of the vehicle to the computer; a means for measuring the deceleration rate of the vehicle and for inputting the deceleration rate of the vehicle to the computer; and a means for measuring the brake system pressure of the vehicle during deceleration of the vehicle and for inputting the brake system pressure of the vehicle to the computer, the computer having means for calculating the effectiveness of the vehicle braking system from data representing the baseline deceleration rate of the vehicle, the deceleration rate of the vehicle, the brake system pressure of the vehicle during deceleration of the vehicle, and the mass of the vehicle, and generating a signal representative of the vehicle brake system effectiveness.

According to a another aspect of the present invention there is provided an apparatus for calculating the effectiveness of a vehicle braking system during deceleration of the vehicle, comprising: a computer; a means for inputting the mass of the vehicle to the computer; a means for measuring the brake system pressure of the vehicle during deceleration of the vehicle and for inputting the brake system pressure to the computer; a means for measuring road slope during deceleration of the vehicle and for inputting the road slope to the computer; a means to measuring air friction of the vehicle and engine friction of the vehicle during deceleration of the vehicle and for inputting the air friction and the engine friction to the computer; a means for determining predicted deceleration of the vehicle; a means for measuring deceleration of the vehicle and for inputting the deceleration of the vehicle to the computer, the computer having means for calculating, from data representing the deceleration of the vehicle, the road slope, the air friction of the vehicle, the engine friction of the vehicle, the brake system pressure during deceleration of the vehicle and the of the vehicle, vehicle brake effectiveness by comparing the deceleration of the vehicle with the predicted deceleration of the vehicle under comparable conditions, and generating a signal representative of the vehicle brake effectiveness; and a means connected to the computer for recording and storing data.

According to further aspect of the present invention there is provided a method for calculating the effectiveness of a vehicle braking system in a vehicle having a brake treadle during deceleration of the vehicle, comprising: providing a baseline deceleration rate for the vehicle; providing the mass of the vehicle; accelerating the vehicle; applying pressure to the vehicle brake treadle to decelerate the vehicle; determining brake system pressure of the vehicle during deceleration of the vehicle; determining the deceleration rate of the vehicle; calculating the effectiveness of the vehicle braking system from data representing the baseline deceleration rate of the vehicle, the deceleration rate of the vehicle, the brake system pressure of the vehicle during deceleration of the vehicle, and the provided mass of the vehicle; and generating a signal representative of the vehicle braking system effectiveness.

BRIEF DESCRIPTION OF THE DRAWINGS

Preferred embodiments of the present invention will now be described and will be better understood when read in conjunction with the accompanying drawings, in which.

Similar reference numerals are used in the Figures to denote similar components.

DETAILED DESCRIPTION OF THE INVENTION

Figure 2:
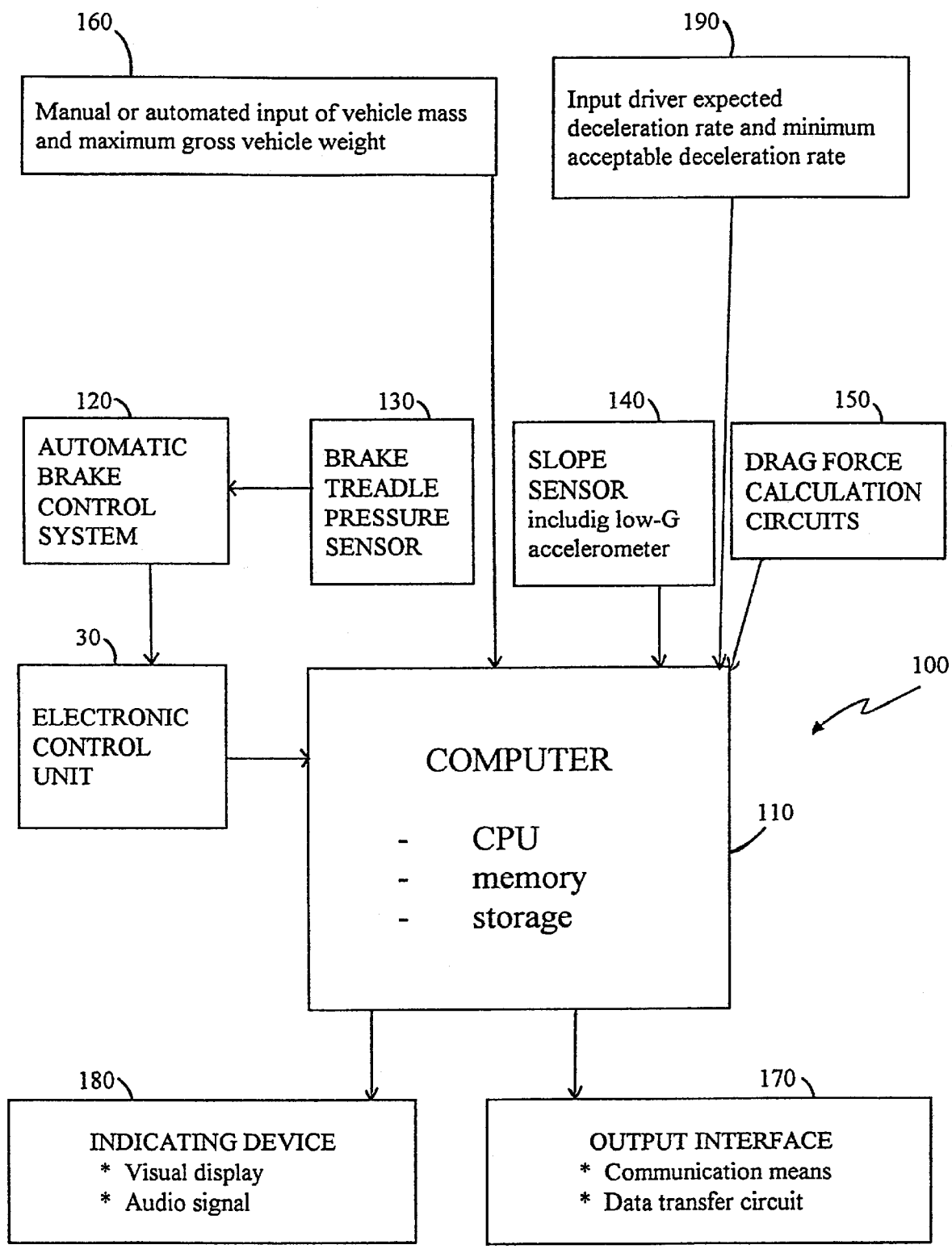
FIG. 2 is block diagram illustrating the major elements of the present invention.
Figure 3:
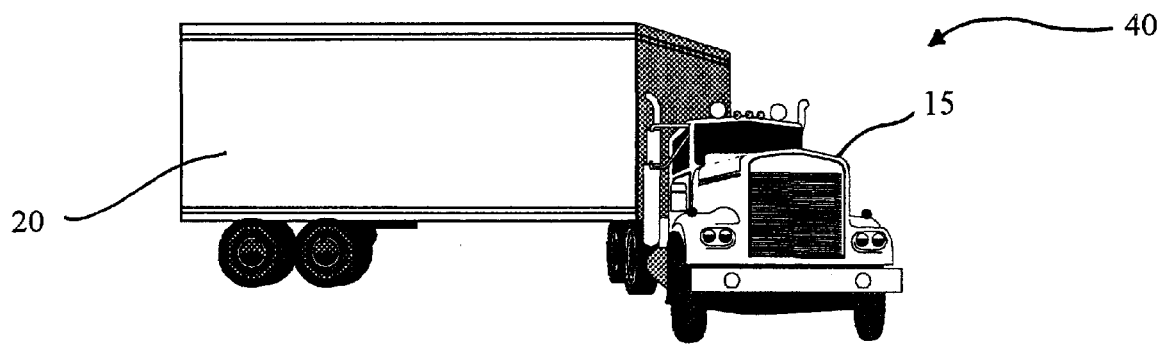
FIG. 3 is a perspective view of a typical tractor semi-trailer vehicle.

The apparatus for determining vehicle brake effectiveness 100 is best understood by reference to FIGS. 2, 3, 4 and 5. FIG. 3 shows a typical tractor semi-trailer vehicle 40 comprising a tractor 15 and a trailer 20.

Figure 4:
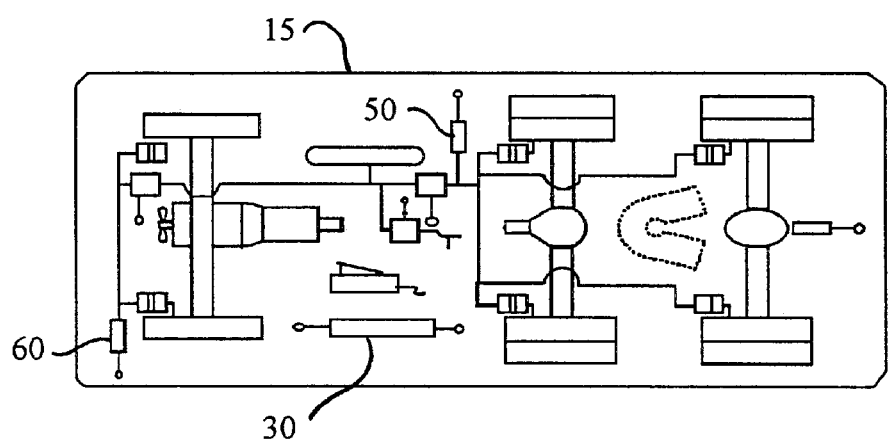
FIG. 4 is a schematic view of the brake control system of the tractor as shown in FIG. 3.
Figure 5:
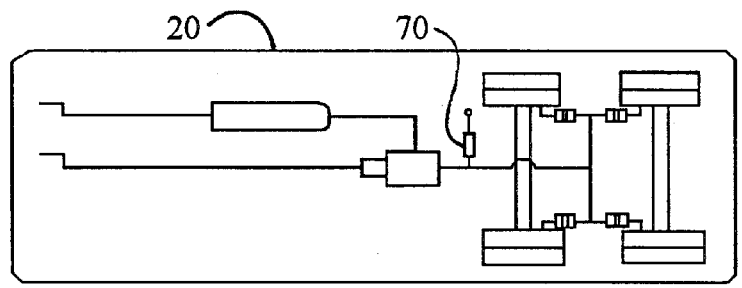
FIG. 5 is a schematic view of the brake control system of semitrailer as shown in FIG. 3.

As shown in FIGS. 4 and 5 tractor 15 and trailer 20 include a drive axle pressure transducer 50, a steering axle pressure transducer 60, and a trailer pressure transducer 70. These transducers monitor air pressure delivered to the corresponding *brake air chambers and provide a signal to the automatic brake system (ABS) 120 (FIG. 2). The signal provided to ABS 120 by pressure transducers 50, 60 and 70 is representative of overall brake system pressure and is used to determine the predicted vehicle deceleration rate of the vehicle as will be described below. At the same time, or in the alternative, brake system pressure can be determined by a brake treadle or brake pedal pressure sensor 130 (FIG. 2) on the brake treadle or brake pedal itself. Tractor 15 includes an electronic control unit (ECU) 30 connected to ABS 120. ECU 30, ABS 120, pressure transducers 50, 60, and 70 and brake treadle pressure sensor 130 are standard equipment on most tractor semi-trailer vehicles, however, vehicles not having such equipment can be easily retrofitted.

With reference now to FIG. 2, the apparatus for determining vehicle brake effectiveness 100 also includes a computer 110 comprising memory, a central processing unit (CPU) and mass storage. Included in the circuits of computer 110 are drag calculation circuits 150 for calculating vehicle drag force and a slope sensor 140 which includes a low-C accelerometer. Computer 110 is connected to existing vehicle automatic brake control system (ABS) 120 via existing vehicle electronic control unit (ECU) 30. A means 160 for inputting actual vehicle mass (M) or maximum gross vehicle weight is provided. Mass may be input manually by the operator or entered automatically directly from automated weigh scales. A further input means 190 is provided to input driver expected deceleration rate and minimum acceptable deceleration rate to computer 110.

The apparatus for determining vehicle brake effectiveness 100 is provided with an output interface 170 including a data transfer circuit, communication means and means for saving data to a storage device. It will be clear to those skilled in the art that output interface 170 may include various communication means including a physical connector or an automatic remote radio frequency (RF) output which can be used to send and receive data without the need for the vehicle to stop. Included as well is an indicating device 180 which may include a video display terminal (VDT), a series of lights or analog dials, or an audio signalling means to provide output on vehicle brake effectiveness and a warning of vehicle brake deterioration to the vehicle operator.

Figure 6:
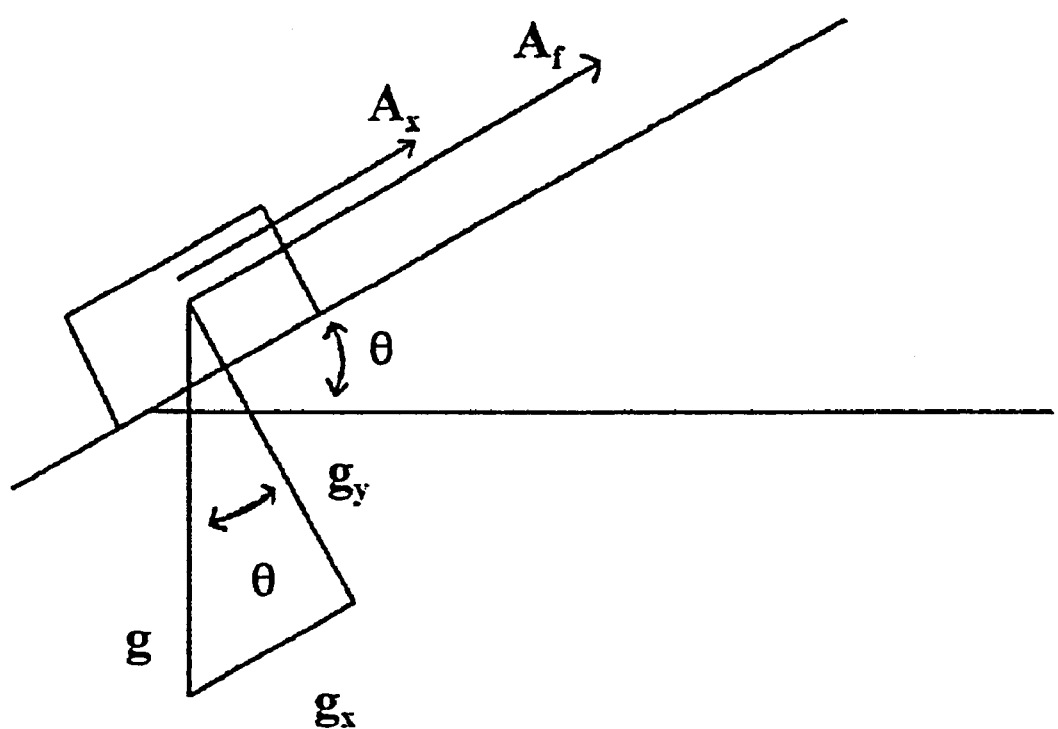
FIG. 6 is a schematic view of a free body acceleration diagram showing the measurement of slope angle.

Road slope sensor 140 produces a signal representing road inclination angle e (FIG. 6). Road slope sensor 140 includes a low-G accelerometer to measure vehicle acceleration. Circuits within computer 110 compare vehicle acceleration measured by the low-G accelerometer to wheel based acceleration measured by ABS 120 to calculate road slope angle 0. With reference to the free body diagram shown in FIG. 6, inclination angle e is calculated using the following formula:

$$\theta = SIN^{-1}[[A_f - A_x]/g];$$

where: $\theta$ = inclination angle or slope;

$A_f$ = forward vehicle acceleration obtained from a measurement of the change in wheel based speed over time, calculated by ABS 120 using the formula:

$$A_f = dV_f/dt$$

where $V_f$ = wheel speed in the forward direction and t=time;

$A_x$ = forward vehicle acceleration as measured by the low-G accelerometer;

g= gravity (Constant)

The measurement of vehicle acceleration $A_f$ as calculated by ABS 120 from the derivative of steering wheel speed is an accurate measurement of vehicle acceleration when the wheels are not slipping. It will be appreciated that under most conditions, steering wheels of tractor semi-trailers are not capable of locking. Wheel based acceleration measured in this way is unaffected by road slope.

By contrast, vehicle acceleration $A_x$ measured by the low-G accelerometer on the slope sensor 140 is affected by slope angle. If the vehicle is travelling on an upward slope, as shown in FIG. 6, the force of gravity (g) acting on the low-G accelerometer will have two components; $g_y$ acting perpendicular to the direction of travel of the vehicle will have no effect on the acceleration rate measured by the low-G accelerometer; and $g_x$ acting 180 degrees opposite to the direction of travel of the vehicle will have a negative effect on the acceleration rate measured by the low-G accelerometer. Since wheel based acceleration $A_f$, as measured by ABS 120, is unaffected by gravity, the difference between wheel based acceleration $A_f$ and the acceleration measured by the low-G accelerometer $A_x$ is, by the above-noted formula, an accurate measure of the angle of inclination θ or road slope.

If the vehicle is travelling on an downward slope the force of gravity (g) acting on the low-G accelerometer will again have two components; $g_y$ acting perpendicular to the direction of travel of the vehicle will have no effect on the acceleration measured by the low-G accelerometer; and $g_x$, this time acting in the direction of travel of the vehicle, will have a positive effect on the acceleration measured by the low-G accelerometer. Again, since wheel based acceleration, as measured by ABS 120, is unaffected by gravity, the difference between wheel based acceleration $A_f$ and acceleration measured by the low-G accelerometer $A_x$ is, according to the above-noted formula, the angle of inclination θ or road slope.

In another embodiment of the present invention (not shown), a second low-G accelerometer is mounted on the slope sensor circuit 140 and positioned to provide readings for lateral acceleration during cornering. Lateral acceleration readings are used to warn the vehicle operator of a potential roll-over condition during excessively sharp cornering.

Drag friction caused by air resistance and engine friction is determined by drag calculation circuits 150 in computer 110. Drag calculation circuits 150 use vehicle speed, engine RPM, engine torque and engine brake output as provided by ECU 30 and ABS 120 to calculate a figure for vehicle drag. Monitoring of engine brake engagement is important since any engagement of the engine brake will corrupt the test results and prevent any meaningful comparison with known standards. If the engine brake is engaged, results are invalidated and discarded.

Actual vehicle mass is input to computer 110 manually by the operator or automatically from automated road scales. Also included is a value for the maximum legal gross vehicle weight (GVW) which is the maximum load legally allowed for a particular vehicle. The system will always calculate brake effectiveness based on the maximum legal gross vehicle weight figure, but will also calculate brake effectiveness based on other mass values provided.

Figure 1:
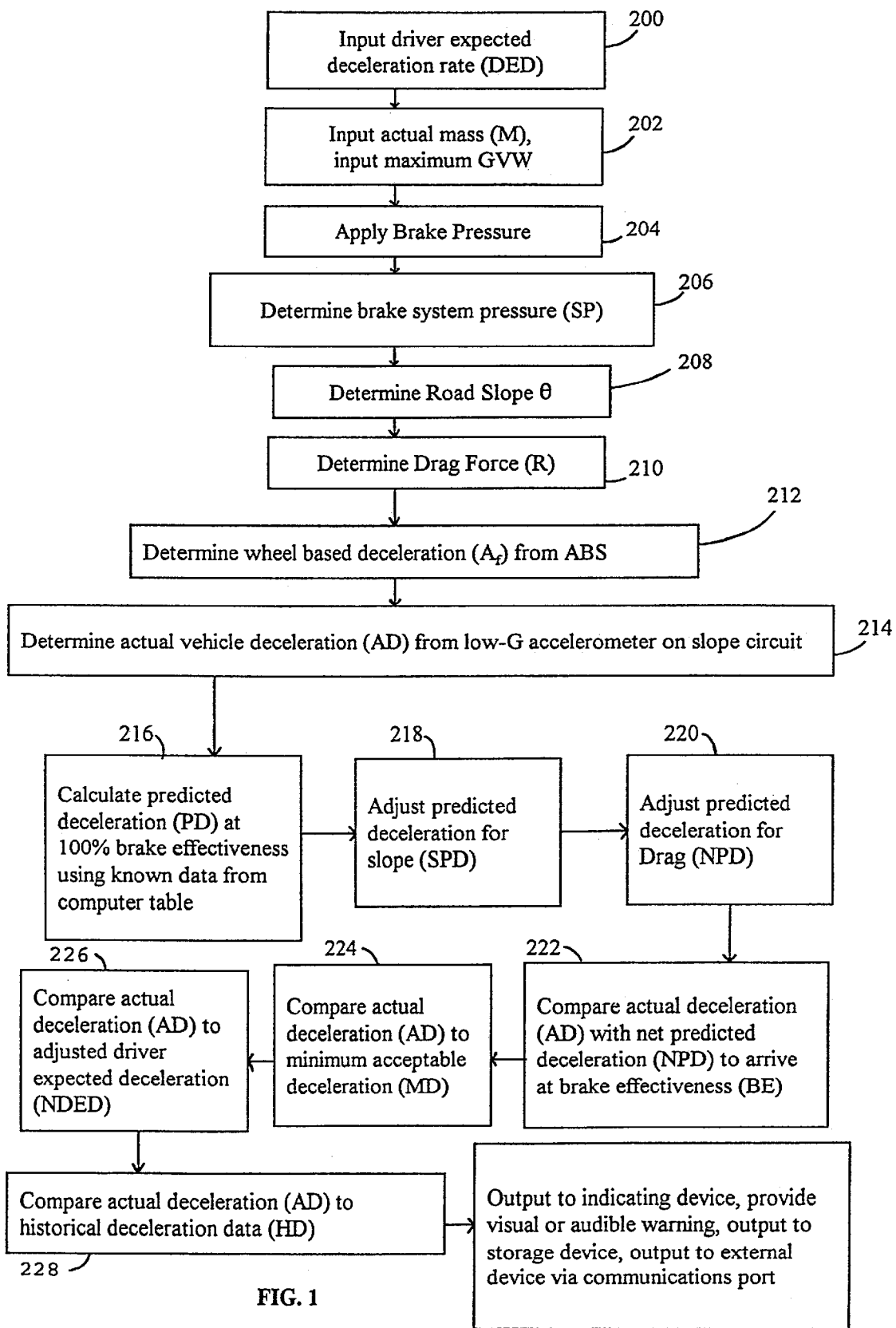
FIG. 1 is a flow diagram illustrating the method of the present invention.

Operation of the apparatus for determining vehicle brake effectiveness 100 is best understood by reference to FIG. 1. A driver expected deceleration rate (DED) 200 is input by the operator via keyboard, read/write identification tag or card or semi-conductor chip. This rate is one which the operator, may have obtained from the last vehicle driven and represents a safe estimated deceleration rate against which the operator wishes results compared. Vehicle mass (M) 202 is input manually by the operator or automatically by automated weigh scales. A figure for maximum legal GVW may also be input at this time or can be stored permanently by computer 110. Brake pressure 204 is applied, and brake system pressure (SP) 206 is determined, from a measurement of brake treadle pressure and/or brake air chamber pressures, during a deceleration procedure. All measurements of air chamber pressures from transducers 40, 50 and 60 are sampled every 1/100 second and averaged for the test period which may range from a minimum 0.3 seconds to a maximum 3 seconds. At the same time, or in the alternative, brake system pressure 206 is determined by brake treadle pressure sensor 130. Road slope angle θ is calculated 208 and drag force (R) is determined 210. It should be noted that road slope angle θ and drag force (R) are monitored continuously by computer 110 so that figures are immediately available when required. A figure for vehicle wheel based deceleration ($A_f$) 212 is obtained from ABS 120 and a figure for actual vehicle deceleration (AD) is obtained from the low-G accelerometer on the slope sensor 140.

Predicted deceleration (PD) 216 is calculated by a comparison of measured brake system pressure (SP) with a table of known deceleration data stored by computer 110 obtained from tests at 100% brake effectiveness. Predicted deceleration (PD) is adjusted for slope 218 and for drag 220. Actual vehicle deceleration rate (AD) is compared to the adjusted value of predicted vehicle deceleration (NPD) 222 to provide a figure for vehicle brake effectiveness (BE) compared to known values. Actual vehicle deceleration (AD) is also compared to the vehicle minimum acceptable deceleration rate (MD) 224, adjusted driver expected deceleration (NDED) 226, and historical stored values (HD) 228. Output 230 is provided to an indicating device 180 (FIG. 2) to provide a means of warning the operator of potential brake problems or a mass overload condition, or for a comparison with historical braking effectiveness data. Output 230 is also sent to a storage device connected to computer 110 for use in future historical comparisons of brake effectiveness data. Output 230 can be in the form of a visual display or an audible signal or both. Output 230 is also provided to an output interface 170 (FIG. 2) which is used to communicate data from the invention to remote devices for monitoring of brake maintenance or to provide data on brake effectiveness to government regulatory agencies.

To determine a potential mass overload situation, the operator compares the reading for vehicle brake effectiveness taken immediately before loading to a reading for vehicle brake effectiveness obtained immediately after loading. Any significant difference between the two readings would be due to either a mass overload situation or faulty brakes. To confirm the cause, the operator could weigh the load or disconnect the load and perform another brake effectiveness test. If brake effectiveness returns to the reading prior to loading, a mass overload would be confirmed. If not, a brake problem would be indicated. Alternatively, if the operator does not have any immediate prior readings for vehicle brake effectiveness, a comparison can be made with stored test data for unloaded and maximum load conditions which were obtained at 100% vehicle brake effectiveness. Any significant differences would indicate a mass overload situation or a brake problem.

As noted, the apparatus for determining vehicle brake effectiveness 100 can assess vehicle brake effectiveness by any one of four different methods:

1) compare actual vehicle deceleration (AD) with adjusted predicted vehicle deceleration rate (NPD) for the same-mass at 100% brake effectiveness 222;
 2) compare actual vehicle deceleration (AD) with a minimum acceptable vehicle deceleration rate (MD) 224;
 3) compare actual vehicle deceleration (AD) with a driver expected vehicle deceleration rate (DED) entered by the operator via keyboard, read/write identification tag or card or semi-conductor chip 226; and
 4) compare actual vehicle deceleration (AD) with historical data of deceleration rates (HD) for that particular vehicle 228.

In accordance with method number one, in order to compare actual vehicle deceleration (AD) with known vehicle deceleration rates at different vehicle masses and brake system pressures, computer 110 is provided with storage for a table of test data representing deceleration rates for the current vehicle in which brake effectiveness is known to be 100%. At 100% brake effectiveness, braking force has a constant relationship with brake system pressure.

Test data is obtained by decelerating test vehicles on a flat surface using various brake system pressures (SP). Deceleration rates are measured with an accelerometer. This produces a brake system pressure versus deceleration rate curve for a given vehicle mass. Net braking force (F) is derived by the formula:

$$F = SP \times k = M \times D$$

where M=actual vehicle mass, D=deceleration rate and k represents the constant relationship between brake system pressure and force. The results are stored as a table by computer 110. It should be obvious to one skilled in the art that a computerized algorithm or graph stored in computer 110 could perform the same function as the above-described table.

Once actual brake system pressure (SP) has been measured during an actual vehicle braking procedure, computer 110 locates the same brake system pressure in its table of stored test data and determines the predicted vehicle deceleration (PD) by the formula:

$$PD = F/M$$

The result is a predicted deceleration rate (PD) which is then adjusted for road slope using the following formula and the slope angle calculation described above, to give a slope adjusted predicted deceleration rate (SPD):

$$SPD = PD - [g \times \sin \theta]$$

Variation in drag force (R), such as that caused by air resistance and engine friction have a very limited effect on deceleration rates in most vehicles. Nevertheless, these forces can be S estimated by monitoring vehicle speed, engine RPM and engine torque. Net predicted deceleration is calculated by the following formula:

$$NPD = SPD - [R/M]$$

Vehicle brake effectiveness (BE) is calculated as follows:

$$BE = AD/NPD$$

where AD is actual vehicle deceleration as measured by the low-G accelerometer. The result can be shown as a percentage or represented by a graph and an audible or visual warning can be sent to the vehicle operator to warn of a brake effectiveness reading outside a particular predetermined range.

In accordance with method number two, the minimum acceptable vehicle deceleration rate (MD), which is independent of current vehicle mass, road slope or drag force, is determined. MD represents the minimum rate at which the vehicle must stop, regardless of the mass. Vehicle brake effectiveness compared to minimum acceptable vehicle deceleration is calculated by the formula:

$$BE = AD/MD$$

and is displayed as a percentage or represented on a graph. Again, an audible or visual warning can be sent to the vehicle operator to warn of a brake effectiveness reading less than the accepted minimum. This will signal a serious problem with the vehicle brakes or a mass overload situation.

In accordance with method number three, driver expected deceleration rate (DED), entered manually by the operator, is adjusted for slope and drag using the following formula:

$$NDED = DED - [g \times \sin \theta] - [R/M]$$

to arrive at net adjusted driver expected deceleration (NDED). Vehicle brake effectiveness compared to net adjusted driver expected effectiveness is:

$$BE = AD/NDED$$

This result is displayed as a percentage or represented on a graph and warnings are given to the operator should the brake effectiveness be less than expected by the operator.

In accordance with method number four, computer 110 compiles and stores historic data of actual vehicle decelerations (HD), recording actual deceleration rate, brake system pressure, slope, drag force, vehicle mass and date. This data is stored in the same type of table used to store known deceleration rates used in method number one described above.

Historic data is compared to the current data from a current vehicle deceleration to assess vehicle brake effectiveness. Current data can be compared to data from any previous deceleration or to an average of data for all previous decelerations. This comparison provides the operator with a means of assessing current brake performance based on historical brake performance for that vehicle.

Historic data can also be used to determine a brake maintenance schedule or can be sent to remote devices for monitoring brake effectiveness or to provide data on brake effectiveness to government regulatory agencies.

Figure 7:
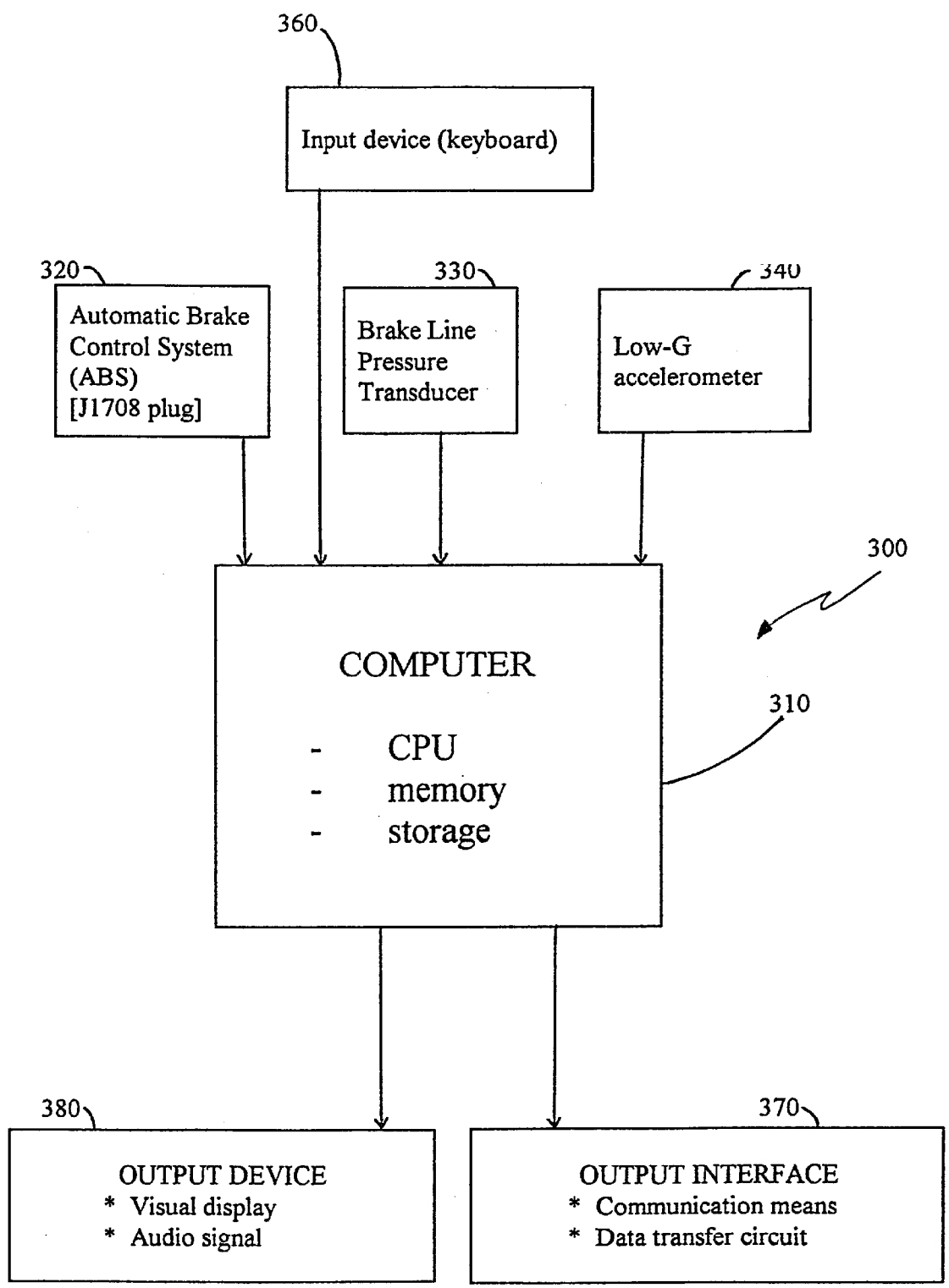
FIG. 7 is a block diagram illustrating the major elements of a preferred embodiment of the present invention.

A preferred embodiment of the present invention is shown in FIG. 7 wherein an apparatus for determining vehicle brake effectiveness 300 is shown in schematic form. A T-type fitting is inserted into the vehicle brake line and a brake line pressure transducer 330 is attached. It will be readily noted by those skilled in this area that many vehicles are already equipped with such brake line pressure transducers. Output from brake line pressure transducer 330 is connected to a computer 310 which includes a CPU, memory and storage. Connected to computer 310 is an input device 360 which may be a keyboard, and an output device 380 which may include both a visual display and an audio output. Also connected to computer 310 is an output interface 370 similar to the output interface 170 described above and shown in FIG. 2. Also connected to computer 310 is a low-G accelerometer 340 for measuring vehicle deceleration and an automatic brake control system (ABS) 320 for providing wheel based speed. On most new vehicles, the typical connection for the wheel based speed signal is the J1708 plug.

In order to calculate vehicle brake effectiveness using the apparatus shown in FIG. 7, it is first necessary to provide computer 310 with a baseline deceleration rate at a constant brake line pressure of 60 psi [BDR(60)] obtained at a time when the vehicle brakes are known to be functioning at 100% effectiveness. This baseline deceleration rate, BDR (60), can be input from data obtained on previous tests or it can be calculated by averaging the results from a series of three typical ramp-type, stop sign stops, with the vehicle under three-quarters to full load conditions.

During a BDR test the driver performs three test stops. The vehicle test mass (TM), which should be from three-quarters maximum to maximum, including the weight of any trailer attached to the vehicle, is entered manually into computer 310 using input device 360. Once the vehicle reaches a speed of approximately 45 miles per hour, the brakes are applied in a manner which smoothly increases pressure until the vehicle is stopped. Vehicle speed, as calculated by ABS 320, and brake line pressure as measured by brake line pressure transducer 330 are displayed on output device 380 to assist the driver in meeting the required test criteria which are described in detail below. Vehicle deceleration is read directly from low-G accelerometer 340. If the required test criteria are met, computer 310 stores the values for vehicle deceleration and brake line pressure over time as the vehicle comes to a controlled stop. Three successful tests are averaged and the result is stored as the baseline deceleration rate (BDR).

Each BDR test must meet strict criteria to be acceptable. First, brake line pressure must reach at least 65 psi before the vehicle's speed drops below 5 miles per hour. Second, the average brake pressure application rate must fall within a range of 2 to 6 psi per second. If the average rate falls outside this range, the test is rejected and the operator is requested to perform another test. Third, computer 310 calculates the instantaneous rate of brake line pressure change over time. This indicates any sudden increases or decreases in brake pressure. If the instantaneous rate of brake line pressure change over time falls outside the range of −10 psi per second to +40 psi per second, the test is rejected. To eliminate the effects of unusual noise spikes, the instantaneous rate of brake line pressure is calculated by using a seven point floating average for each sample.

Using BDR test data which meets the above criteria for brake pressure and deceleration over time, the baseline deceleration rate of the vehicle can be calculated for a constant brake application pressure of 60 psi. This is called the BDR(60). In the present invention BDR(60) is calculated using a third order curve fit of BDR test data comprising deceleration versus pressure, however, it will be understood by those skilled in the field that other similar mathematical models could be used to perform the same task. The result is a single number, BDR(60), that represents the vehicle deceleration rate at a constant brake pressure of 60 psi, at a test mass of TM and 100% vehicle brake effectiveness.

Once a value for BDR(60) at 100% brake effectiveness has been obtained, this figure is used as a baseline for comparison with actual vehicle deceleration rates (ADR), to determine the current vehicle brake effectiveness. ADR test results must meet the same criteria as designed for the BDR test, that is, a ramp-type, stop sign stop which reaches a minimum brake application pressure of 65 psi before the vehicle's speed drops below 5 miles per hours. The average pressure application rate must fall within the range of 2 psi per second to 6 psi per second, and the instantaneous rate of brake line pressure change must fall within the range of −10 psi per second to +40 psi per second. Any ADR tests which do not meet this criteria will be rejected and the operator will be asked to perform another stop using a smoother, more constant brake application pressure.

Once a successful ADR brake test has been achieved, the ADR at 60 psi, ADR(60), is calculated using the same method described above for calculating BDR(60). The result is a single number which represents vehicle deceleration at a constant brake pressure of 60 psi.

In this embodiment of the present invention, no adjustment is made for drag forces (R) caused by air resistance and engine friction. Since both the BDR and the ADR test criteria are identical, any drag forces caused by air resistance or engine friction are similar and thus self compensating. As described above, vehicle engine brake is monitored to ensure that it is not engaged during a test. Any engagement of the vehicle engine brake would invalidate the test results.

Since all vehicle deceleration rates are measured by low-G accelerometer 340 and since BDR(60) is calculated on level terrain, adjustments for road slope are also unnecessary. This is made clear by the following example. If the ADR test is conducted on a down slope, the extra horizontal force caused by the pull of gravity on the vehicle will increase the actual vehicle stopping distance, thereby decreasing the ADR(60) number since it will take relatively longer for the vehicle to come to a stop. However, the gravitational effect of the down slope will cause an increase in the deceleration rate ADR(60) as read by low-G accelerometer 340. The increase in the ADR(60) caused by low-G accelerometer 340 will be exactly equal to the decrease in the ADR(60) caused by the increased stopping distance due to the downward slope. Similarly, stopping on an uphill grade results in a shorter vehicle stopping distance. This tends to increases the ADR(60), however, gravitational forces decrease the reading from low-G accelerometer 340, resulting in a comparable decrease in the ADR(60) number. The result is that, following adjustment for mass as described below, the ADR(60) can be compared directly to the BDR(60), regardless of the slope on which the ADR(60) is calculated.

In order to calculate the current vehicle brake effectiveness BE, the ADR(60) is multiplied by the ratio of actual vehicle mass (M) input by the operator to the vehicle test mass (TM) from the BDR test results:

$$ADR(m60)=ADR(60) \times M/TM$$

The result is a mass adjusted deceleration rate ADR(m60) which can be directly compared to the baseline deceleration rate BDR(60) to provide the current vehicle brake effectiveness:

$$BE=ADR(m60)/BDR(60)$$

Brake effectiveness BE is displayed in a similar manner to that previously described, as a percentage or represented on a graph, and audio and visual warnings are provided should the brake effectiveness drop below a certain predetermined level.

Figure 8:
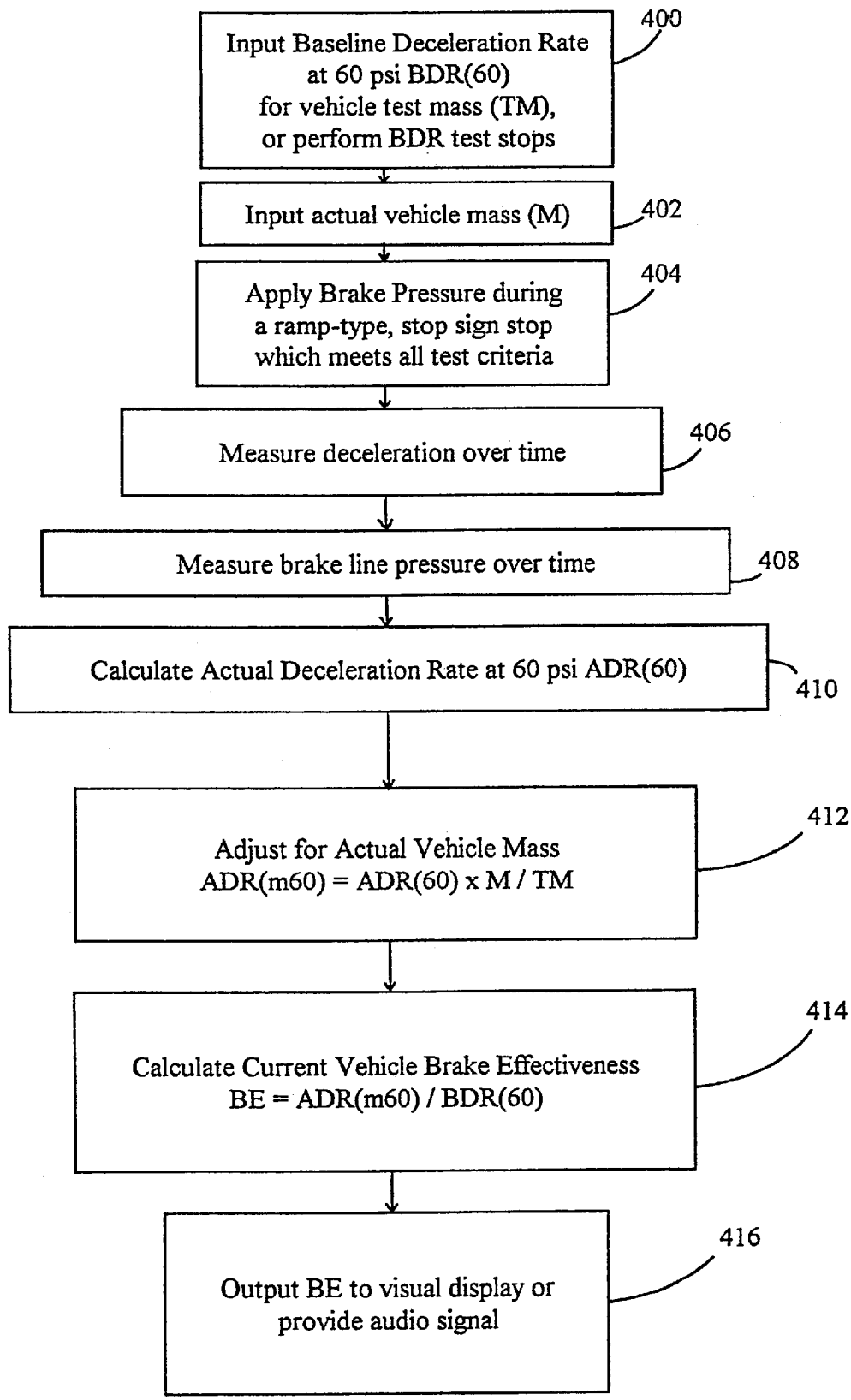
FIG. 8 is a flow diagram illustrating the method of the preferred embodiment of the present invention shown in FIG. 7.

Operation of the above-described apparatus for determining vehicle brake effectiveness 300 is best understood by reference to FIG. 8. A baseline deceleration rate at a constant brake pressure of 60 psi [BDR(60)] is input by the operator at 400 or calculated by performing several test stops as described above. The BDR(60) is determined at a vehicle test mass (TM) which is between three-quarters and full vehicle load at a time when the brakes are known to be operating at 100% effectiveness. Actual vehicle mass (M) is input manually by the operator at 402 or automatically by automated weigh scales. An actual deceleration rate [ADR] test is conducted by applying brake pressure at 404 in a ramp-type, stop sign stop which meets all of the above-described test criteria. Actual vehicle deceleration over time is measured by low-G accelerometer 340 at 406 and brake line pressure over time is measured by brake line pressure transducer 330 at 408. The actual vehicle deceleration at 60 psi [ADR(60)] is calculated at 410 and adjusted for the current vehicle mass (M) at 412. Vehicle brake effectiveness BE is calculated at 414 and the results are output to a visual display or audio warning device at 416. Results can also be stored for future reference or output via a communications port to external reading devices.

Preferred embodiments of the invention have been described, however, numerous modification, variations and adaptations, obvious to one skilled in the art, may be made to the particular embodiments of the invention described above without departing from the spirit and scope of the invention as defined in the claims.

The embodiments of the invention in which an exclusive property or privilege is claimed are defined as follows:

1. An apparatus for calculating effectiveness of a vehicle braking system during deceleration of the vehicle, comprising:
   a computer;
   a means for inputting a baseline deceleration rate of the vehicle to the computer;
   a means for inputting the mass of the vehicle to the computer;
   a low-g accelerometer for measuring a deceleration rate of the vehicle and means for inputting the deceleration rate of the vehicle to the computer;
   a slope compensating means for generating a slope adjusted deceleration rate of the vehicle, and means for inputting the slope adjusted deceleration rate of the vehicle to the computer to automatically compensate for the effect of road slope during deceleration, and
   a means for measuring brake system pressure of the vehicle during deceleration of the vehicle and for inputting the brake system pressure of the vehicle to the computer,
      the computer having means for calculating the effectiveness of the vehicle braking system from data representing the baseline deceleration rate of the vehicle, the slope adjusted deceleration rate of the vehicle, the brake system pressure of the vehicle during deceleration of the vehicle, and the mass of the vehicle, and generating a signal representative of the effectiveness of the vehicle braking system.

2. The apparatus according to claim 1, wherein the baseline deceleration rate of the vehicle is a deceleration rate calculated for a constant predetermined brake system pressure and vehicle test mass at a time when the vehicle braking system is functioning at 100% braking effectiveness.

3. The apparatus according to claim 2, wherein the baseline deceleration rate of the vehicle is calculated by conducting and averaging data obtained during a plurality of test decelerations of the vehicle.

4. The apparatus according to claim 3, further comprising means for rejecting data obtained during one of the test decelerations of the vehicle if the data obtained does not meet predetermined test criteria.

5. The apparatus according to claim 4, wherein the predetermined test criteria comprise:
   average brake pressure application rate of the vehicle during a test deceleration;
   instantaneous brake pressure application rate of the vehicle during a test deceleration; and
   reaching a predetermined brake system pressure of the vehicle before the speed of the vehicle drops below 5 miles per hour during a test deceleration.

6. The apparatus according to claim 5, wherein the average brake system pressure application rate of the vehicle is between 2 psi per second and 6 psi per second, the instantaneous brake pressure application rate of the vehicle is from −10 psi per second to +40 psi per second, and the predetermined brake system pressure of the vehicle, before the speed of the vehicle drops below 5 miles per hour, is 65 psi.

7. The apparatus according to claim 6, wherein the vehicle test mass is between ¾ maximum and maximum vehicle load, and the constant predetermined brake system pressure is 60 psi.

8. The apparatus according to claim 1, further comprising means for automatically inputting the mass of the vehicle to the computer.

9. The apparatus according to claim 1, wherein the computer comprises memory means and storage means for storing data representing the baseline deceleration rate of the vehicle, the deceleration rate of the vehicle, the brake system pressure of the vehicle during deceleration of the vehicle, and the effectiveness of the vehicle braking system.

10. The apparatus according to claim 1, further comprising an output indicating device connected to the computer and responsive to the signal representative-of vehicle brake system effectiveness, for immediately indicating the vehicle brake system effectiveness during deceleration of the vehicle to the vehicle operator.

11. The apparatus according to claim 1, wherein the means for measuring the brake system pressure of the vehicle during deceleration of the vehicle is a brake line pressure transducer connected to the vehicle braking system.

12. The apparatus according to claim 1, further comprising:
   an automatic braking control system connected to the computer for providing a signal representative of vehicle wheel based speed; and
   a display means connected to the computer for displaying the signal representative of vehicle wheel based speed to the vehicle operator.

13. The apparatus according to claim 11, further comprising an output interface connected to the computer for providing external access to data accumulated in the memory and storage of the computer representing baseline deceleration rate of the vehicle, brake system effectiveness of the vehicle, the deceleration rate of the vehicle, and the brake system pressure of the vehicle during deceleration of the vehicle.

14. The apparatus according to claim 7, further comprising means for rejecting data obtained during deceleration of the vehicle if the data does not meet predetermined deceleration criteria.

15. The apparatus according to claim 14, wherein the predetermined deceleration criteria comprise:
   the average brake pressure application rate of the vehicle during deceleration of the vehicle;
   the instantaneous brake pressure application rate of the vehicle during deceleration of the vehicle; and
   reaching a predetermined brake system pressure of the vehicle before the speed of the vehicle drops below 5 miles per hour during deceleration of the vehicle.

16. The apparatus according to claim 15, wherein the average brake system pressure application rate is between 2 psi per second and 6 psi per second, the instantaneous brake pressure application rate is from −10 psi per second to +40 psi per second, and the predetermined brake system pressure, before the speed of the vehicle drops below 5 miles per hour, is 65 psi.

17. A method for calculating effectiveness of a vehicle braking system in a vehicle having a brake pedal during deceleration of the vehicle, comprising:
   providing a baseline deceleration rate for the vehicle;
   providing the mass of the vehicle;
   accelerating the vehicle;
   applying pressure to the vehicle brake pedal to decelerate the vehicle;
   determining brake system pressure of the vehicle during deceleration of the vehicle;
   determining a deceleration rate of the vehicle using a low-g accelerometer;
   generating a slope adjusted deceleration rate of the vehicle to automatically compensate for the effect of road slope during deceleration of the vehicle;

calculating the effectiveness of the vehicle braking system from data representing the baseline deceleration rate of the vehicle, the slope adjusted deceleration rate of the vehicle, the brake system pressure of the vehicle during deceleration of the vehicle, and the mass of the vehicle; and generating a signal representative of the effectiveness of the vehicle braking system.

18. The method of claim 17, wherein the baseline deceleration- rate of the vehicle is a deceleration rate calculated for a constant predetermined brake system pressure and vehicle test mass at a time when the vehicle braking system is functioning at 100% braking effectiveness.

19. An apparatus for calculating effectiveness of a vehicle braking system during deceleration of the vehicle, comprising:

a computer;

a means for inputting the mass of the vehicle to the computer;

a means for measuring brake system pressure of the vehicle during deceleration of the vehicle and for inputting the brake system pressure to the computer;

a means for measuring road slope during deceleration of the vehicle and for inputting the road slope to the computer, said means including a low-g accelerometer;

a means to measuring air friction of the vehicle and engine friction of the vehicle during deceleration of the vehicle and for inputting the air friction and the engine friction to the computer;

a means for determining predicted deceleration of the vehicle and for inputting the predicted deceleration of the vehicle to the computer;

a means for measuring deceleration of the vehicle and for inputting the deceleration of the vehicle to the computer;

the computer having means for calculating the effectiveness of the vehicle braking system, from data representing the deceleration of the vehicle, the road slope, the air friction of the vehicle, the engine friction of the vehicle, the brake system pressure during deceleration of the vehicle, the mass of the vehicle, and the predicted deceleration of the vehicle under comparable conditions, and generating a signal representative of the effectiveness of the vehicle braking system; and a means connected to the computer for recording and storing data.

20. The apparatus according to claim 1, wherein the slope compensating means includes a low-g accelerometer.

21. The method of claim 17, wherein a low-g accelerometer is used in the step of generating a slope adjusted deceleration rate of the vehicle.

* * * * *